US008522250B2

(12) United States Patent
Conti et al.

(10) Patent No.: US 8,522,250 B2
(45) Date of Patent: Aug. 27, 2013

(54) MANAGING ACCESS TO A SHARED RESOURCE IN A DATA PROCESSING SYSTEM

(75) Inventors: Chiara Conti, Rome (IT); Mariella Corbacio, Rome (IT); Giuseppe Longobardi, Castellammare di Stabia (IT); Alessandra Masci, Rome (IT); Enrico Nocerini, Rome (IT); Pia Toro, Rome (IT)

(73) Assignee: International Business Machines Corporation, Armonk, NY (US)

( * ) Notice: Subject to any disclaimer, the term of this patent is extended or adjusted under 35 U.S.C. 154(b) by 121 days.

(21) Appl. No.: 13/212,131

(22) Filed: Aug. 17, 2011

(65) Prior Publication Data

US 2012/0079495 A1 Mar. 29, 2012

(30) Foreign Application Priority Data

Sep. 29, 2010 (EP) .................................... 10181738

(51) Int. Cl.
*G06F 9/46* (2006.01)
(52) U.S. Cl.
USPC ........... 718/104; 712/235; 712/236; 712/237; 711/147; 710/200
(58) Field of Classification Search
USPC ......... 718/104; 712/235, 236, 237; 711/147; 710/200
See application file for complete search history.

(56) References Cited

U.S. PATENT DOCUMENTS

| 6,009,275 | A | 12/1999 | DeKoning et al. |
| 6,567,873 | B1* | 5/2003 | Henriksen ..................... 710/240 |
| 6,718,448 | B1 | 4/2004 | Ofer |
| 7,353,515 | B1 | 4/2008 | Ton et al. |
| 7,454,579 | B1 | 11/2008 | Ravan |
| 2008/0080445 | A1 | 4/2008 | Bayne et al. |
| 2008/0163217 | A1 | 7/2008 | Accapadi et al. |
| 2010/0043009 | A1 | 2/2010 | Marchand |

FOREIGN PATENT DOCUMENTS

| JP | 02194442 A | 8/1990 |
| JP | 09319601 A | 12/1997 |

OTHER PUBLICATIONS

Bier, Jeffrey C., et al., "A Class of Multiprocessor Architectures for Real-Time DSP", IEEE International Symposium on Circuits and Systems. May 1-3, 1990. vol. 4, pp. 2622-2625.

* cited by examiner

*Primary Examiner* — Emerson Puente
*Assistant Examiner* — Steven Do
(74) *Attorney, Agent, or Firm* — Marcia L. Doubet

(57) ABSTRACT

Processes requiring access to shared resources are adapted to issue a reservation request, such that a place in a resource access queue, such as one administered by means of a semaphore system, can be reserved for the process. The reservation is issued by a Reservation Management module at a time calculated to ensure that the reservation reaches the head of the queue as closely as possible to the moment at which the process actually needs access to the resource. The calculation may be made on the basis of priority information concerning the process itself, and statistical information gathered concerning historical performance of the queue.

3 Claims, 10 Drawing Sheets

MANAGING ACCESS TO A SHARED RESOURCE IN A DATA PROCESSING SYSTEM

BACKGROUND OF THE INVENTION

The present invention relates to managing access to a shared resource in a data processing system.

It is a common programming technique to use software semaphores to serialize access to shared resources, of which examples include printers, tape, disks units, etc., or for example, internal software resources like files, tables, buffers, storage areas in general, and so on.

FIG. 1 shows schematically the components of a semaphore system as known in the prior art. As shown in FIG. 1, the process 110 is in communication with a semaphore module 130, which maintains a set of semaphores, each one with its own queue 141, 142, 143, and furthermore acts as an intermediary to communications with one or more shared resources 120.

When the process 110 needs to access the resource 120, it queries the semaphore module 130. If the resource requested 120 is ready ("green"), the semaphore module sets its status to busy ("red") and the process 110 is accorded control of the shared resource 120. When the process finishes with the resource 120, it releases the resource and the semaphore module returns its status to ready ("green"). If when the query is received the semaphore module's status is busy ("red"), the process 110 is registered inside the semaphore queue 143 corresponding to the resource 120 and its request to access the resource usage is enqueued. When the process 110's enqueued request reaches the head of the queue, the semaphore module sets its status to "green" for that queue element, the waiting process 110 is woken up, and it can use and then release the resource 120, which is then removed from the semaphore queue.

As a side effect of this way of handling the software semaphores, especially in case of heavily used resources, a process has to wait to get its request dispatched and serviced. There are different algorithms to handle the semaphore queue stacks based on different criteria (for example, First-In-First-Out or FIFO, Last-In-First-Out or LIFO, priority, request types, weights, and so forth) but once there is a queue, a process has to wait a greater or lesser amount of time for its turn.

FIG. 2 shows the progress of a request through the queue in the system of FIG. 1. FIG. 2 plots queue position on a horizontal axis, and time on a vertical axis. The total length of the queue at any given time is represented by the shaded area between the axes and the line 215. If a request is issued by the process 110 at a time indicated by the dotted line 205, the request proceeds along the queue in the manner represented by the line 210, and eventually arrives at the head of the queue at the point 220, whereupon the resource 120 becomes available to the process 110.

The article entitled "Semaphore Queue Priority Assignment for Real-Time Multiprocessor Synchronization" published in IEEE Transactions in Software Engineering October 1995 (vol. 21 no. 10) pp. 834-844 by Victor B. Lortz and Kang G. Shin describes work on real-time scheduling with global shared resources in multiprocessor systems that assigns as much blocking as possible to the lowest-priority tasks. In this paper, it is shown that better schedulability can be achieved if global blocking is distributed according to the blocking tolerance of tasks rather than their execution priorities.

US20080244130 describes how, in an ordered semaphore management system, a pending state allows threads not competing for a locked semaphore to bypass one or more threads waiting for the same locked semaphore. The number of pending levels determines the number of consecutive threads vying for the same locked semaphore which can be bypassed. When more than one level is provided, the pending levels are prioritized in the queued order.

The article entitled "Priority Semaphores" from the Oxford Computer Journal, Volume 32, Issue 1 pp. 24-28 by B. Freisleben and J. L. Keedy discusses how neither low-level mechanisms such as semaphores nor higher-level mechanisms such as path expressions provide a simple means of solving synchronisation problems involving the scheduling of processes or classes of processes according to different priorities. This paper presents a new set of primitives which are easy to use and simple to implement. Their use is described in terms of the familiar reader-writer problem and the general scheduling problem involving arbitrary levels of priority with support for pre-emption and shared access by certain process classes. An efficient implementation, which reduces to a minimum the number of calls required to the process scheduler, is then described.

BRIEF SUMMARY

According to one embodiment, the present invention provides for managing access to a shared resource in a data processing system, comprising: maintaining a queue of access requests for access to the shared resource; receiving a reservation request, the reservation request foreshadowing a forthcoming access request from a process; responsive to receiving the reservation request, calculating a queue entry cycle for the forthcoming access request; waiting until the calculated queue entry cycle is attained, and responsive to attaining the calculated queue entry cycle, adding a reservation access request to the queue of access requests at the calculated queue entry cycle; and receiving the foreshadowed access request. In another embodiment, the present invention provides for obtaining access to a shared resource in a data processing system, comprising: receiving a reservation request from a process, the reservation request foreshadowing a forthcoming access request from the process; receiving the foreshadowed access request from the process a predetermined time after receiving the reservation request; and accessing the shared resource by the process at a time of sending the foreshadowed access request, the reservation request having established an advance reservation, at the predetermined time, for the process to obtain a semaphore that allows the accessing. In yet another embodiment, the present invention provides for sending a reservation request from a process, the reservation request foreshadowing a forthcoming access request from the process that will request access to a shared resource; sending the foreshadowed access request from the process a predetermined time after sending the reservation request; and accessing the shared resource by the process at a time of sending the foreshadowed access request, the reservation request having established an advance reservation, at the predetermined time, for the process to obtain a semaphore that allows the accessing.

Further advantages of the present invention will become clear to the skilled person upon examination of the drawings and detailed description. It is intended that any additional advantages be incorporated herein.

BRIEF DESCRIPTION OF THE SEVERAL VIEWS OF THE DRAWINGS

Embodiments of the present invention will now be described by way of example with reference to the accompanying drawings in which like reference numbers denote similar elements, and in which.

DETAILED DESCRIPTION

Normally in a flow of events, it is known to the software programmer that sooner or later there is the possibility to use a shared resource that is protected by a semaphore (with a usage queue). According to an embodiment of the present invention, knowing that the process can later require the access to the semaphore, its request will be put on the semaphore queue in advance. That way, when it is the actual time that the request needs to be processed, having queued the request in advance, there is less time to wait in the queue because part of the wait time has already elapsed during the processing. It is a sort of "reservation" in advance of the semaphore.

An embodiment of the present invention uses a component that handles the requests to, and the responses from, the semaphores.

Figure 3:
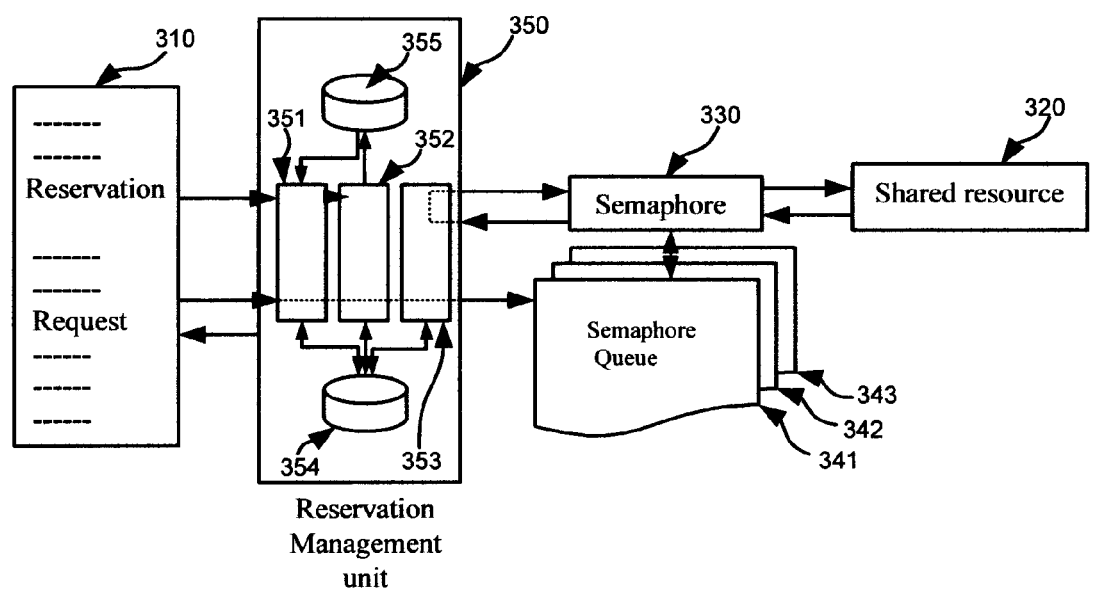
FIG. 3 shows schematically the components of a semaphore system according to a first embodiment.

FIG. 3 shows schematically the components of a semaphore system according to a first embodiment. As shown in FIG. 3, a process 310 is in communication with a reservation management unit 350, which acts as an interface to the semaphore module 330, which maintains a plurality of access request queues 341, 342, 343, for access to one or more shared resources 320 and furthermore acts as an intermediary to communications with the shared resources 320.

In operation, the process 310 incorporates an extra function whereby it may issue a reservation request, foreshadowing a forthcoming access request, to the Reservation Management unit 350. When the Reservation Management unit 350 receives such a Reservation Request, the Reservation Management Unit calculates a queue entry cycle at which a reservation access request should be made in order for the resource to be available when the access request itself is received. The Reservation Management Unit 350 waits until the calculated queue entry cycle arrives, and then adds a reservation access request to the queue 341 at the calculated queue entry cycle. In due course, the access request from the process 310 is received, whereupon, if the queue entry cycle was optimally selected, the resource 320 will be immediately available to the process 310 without the process 310 having to wait for the resource to become available.

Figure 1:
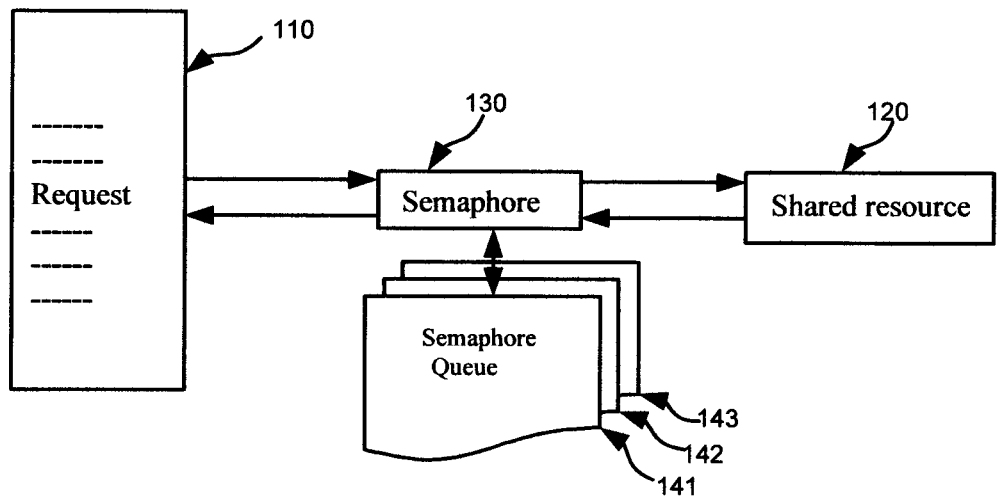
FIG. 1 shows schematically the components of a semaphore system as known in the prior art.
Figure 4:
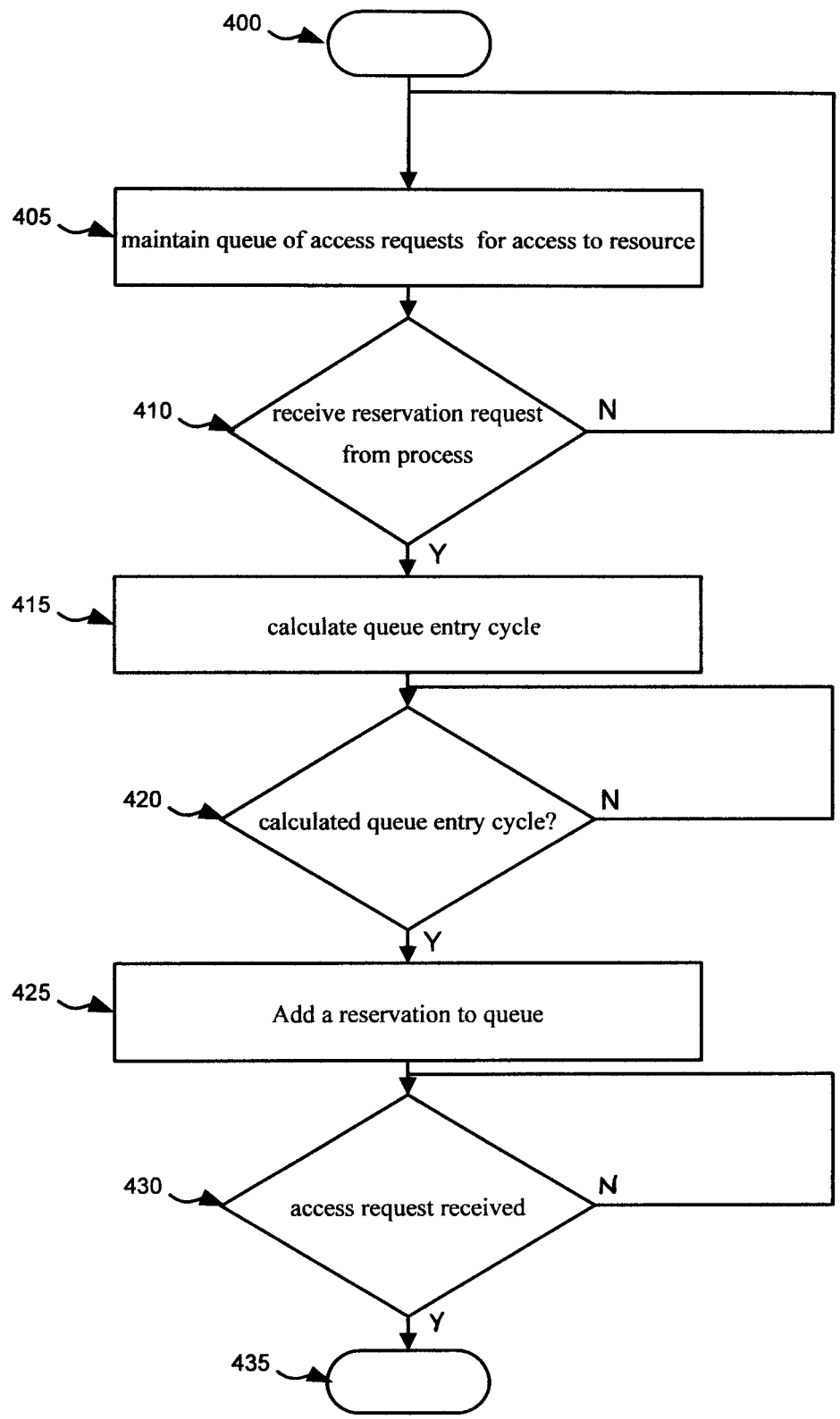
FIG. 4 shows the steps of the method of operation of the first embodiment.

FIG. 4 shows steps of a method of operation of a first embodiment. As shown in FIG. 4, the method starts at step 400, before proceeding to step 405 at which a queue of access requests 341 is maintained, as regards the position of existing requests in the queue, the addition of new requests, and the removal of completed requests. At step 410, it is determined whether a reservation request has been received from the process 310, and if a request has been received, the method proceeds to step 415. If no request is received, the method reverts to step 405. At step 415, the method calculates a queue entry cycle, before proceeding to step 420 at which it is determined whether the calculated entry cycle has been attained. If it is determined that the calculated queue entry cycle has been attained, the method proceeds to step 425. If it is determined that the calculated queue entry cycle has not been attained, the method loops back to step 420. At step 425, a reservation access request is added to the queue for the process 310 to access the resource 320, before proceeding to step 430. At step 430, it is determined whether the access request corresponding to the reservation added at step 425 has been received. In a case where the access request is received, the system will then arbitrate access to the resource in the manner described with respect to FIG. 1. In a case where the access request is not received, the method loops back to step 430.

As shown in FIG. 3, the reservation management unit 350 may be seen according to certain embodiments as comprising a Request Handler 351, a Reservation Coordinator 352, and a Reservation Scheduler 353, where the Request Handler 351, the Reservation Coordinator 352, and the Reservation Scheduler 353 are all in communication with a Reservation Table 354. Furthermore, the Request Handler 351 and the Reservation Coordinator 352 are in communication with a queue statistics table 355. Although many other architectures may be envisaged for implementing the steps of FIG. 4, this configuration will now be explored in greater detail by way of example.

Figure 2:
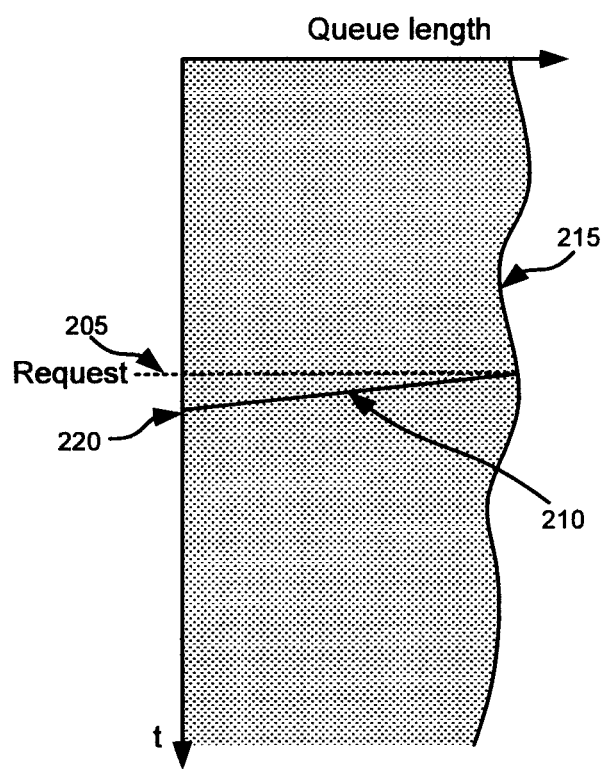
FIG. 2 shows the progress of a request through the queue in the system of FIG. 1.
Figure 5:
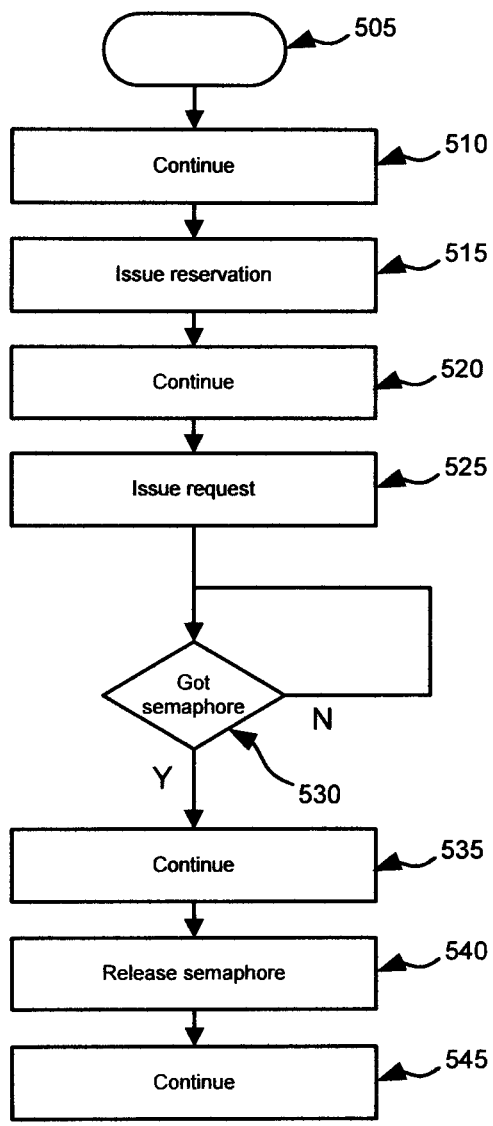
FIG. 5 shows steps implemented in a process according to certain embodiments.

FIG. 5 shows steps implemented in a process according to certain embodiments. According to preferred embodiments, a process is modified to make use of the features of the present invention. In particular, at design time, the developers of the code implementing the process 310 will determine at what points access to a shared resource 320 will be required, and on the basis of this determination will incorporate instructions for the issuance of a reservation request in advance of such points. Accordingly, as shown in FIG. 5, the method starts at step 505 with the initiation of the process 310, and moves to step 510, at which process activities unrelated to the context of the present invention are carried out. At step 515, the method arrives at the point at which the reservation request is issued, in anticipation of a need by the process 310 of access to the shared resource 320. The process 310 then resumes its activities unrelated to the context of the present invention at step 520, until arriving at the part of the process 310 at which access to the required resource is in fact required, whereupon a request for access to the resource is issued at step 525, substantially as described with respect to FIGS. 1 and 2. The method then proceeds to step 530, at which it is determined whether the semaphore is green for the process 310 to access the shared resource 320. If the semaphore is green, the method proceeds to step 535, at which the process continues, in particular in accessing the shared resource 320, before releasing the semaphore at step 540. If the semaphore is determined not to be green at step 530, the method loops back to step 530 until the semaphore turns green, and the shared resource 320 becomes available. Once the method releases the semaphore at step 540, the process resumes activities unrelated to the context of the present invention at step 545.

In particular, the process carries out the principal steps of sending in advance a reservation request from a process, foreshadowing a forthcoming access request, sending said access request a predetermined time after sending said reservation request, and accessing said resource.

Figure 6:
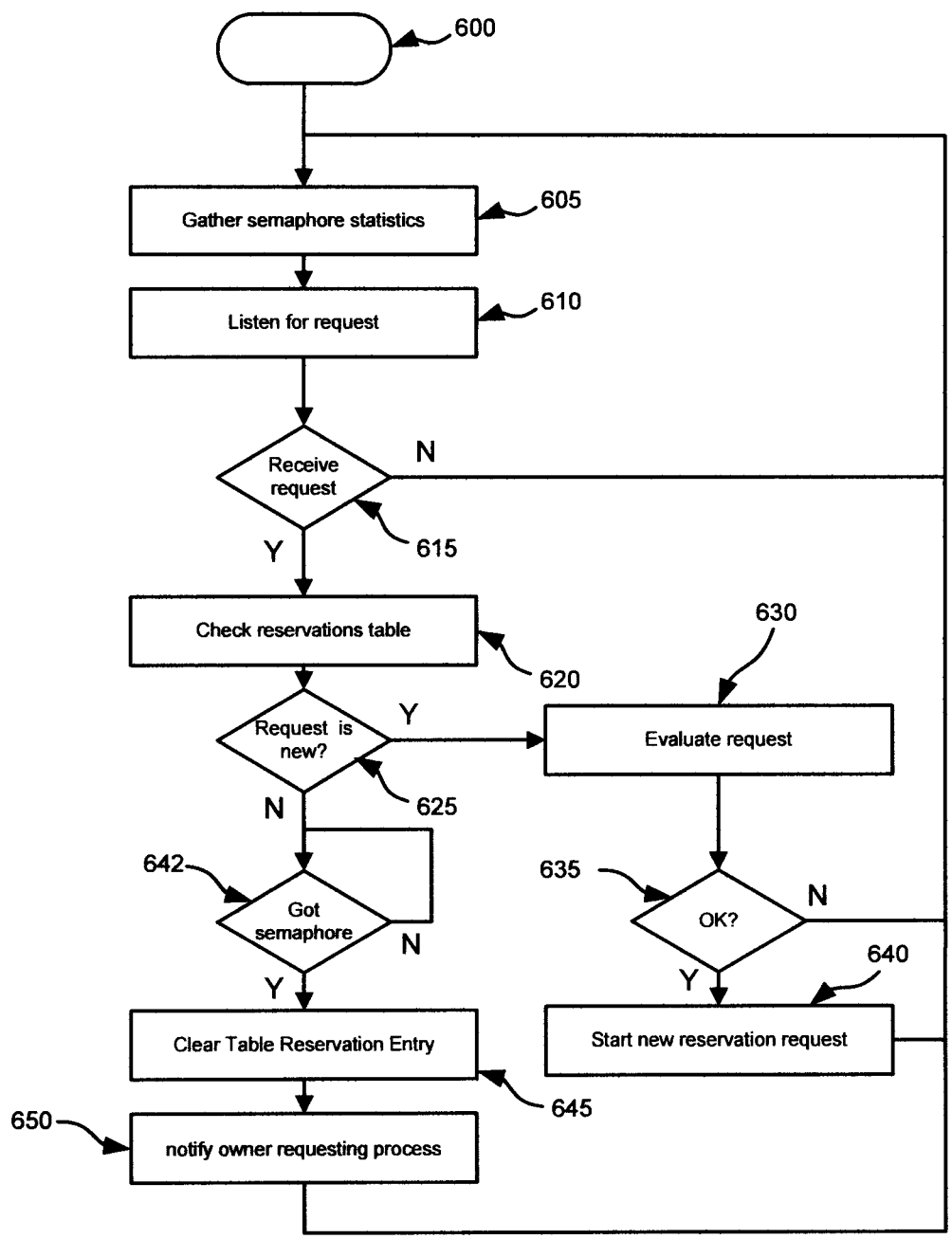
FIG. 6 shows steps implemented in the Request Handler of the reservation management unit according to certain embodiments.

FIG. 6 shows steps implemented in the Request Handler of the reservation management unit according to certain embodiments. As shown in FIG. 6, the method starts at step 600, and proceeds immediately to step 605, at which the Request Handler gathers semaphore statistics, which are compiled in the semaphore statistics table 355. The method proceeds to step 610, at which it listens for semaphore system requests, either for reservations or access, as described above. If it is determined at step 615 that a request has been received, the method proceeds to step 620, and otherwise reverts to step 605. At step 620, the method checks the reservations table 354, to determine at step 625 whether the received request relates to a known request associating a requesting process with a requested resource. In the case where the request is found to relate to a known request, the request is considered to constitute the access request referring back to an earlier reservation, in which case the method proceeds to step 642. Otherwise the request is considered to be a new request, and the method proceeds to step 630. At step 642 the method determines whether the process 310 has been accorded access to the resource 320 with reference to the corresponding semaphore queue. If it is determined that the process has been accorded access, that is, the semaphore is "green", the method proceeds to step 645, and otherwise loops back to step 642 until access is accorded. At step 645, the method removes the table reservation entry from the reservation table 354, and then proceeds to step 650, where the process is able to access the shared resource 320 in the manner described with reference to FIGS. 1 and 2, and may therefore notify the owner of the requesting process before looping back to step 605. At step 630, since it has been determined that the request is a new reservation request, the request itself is evaluated to determine whether it is valid. One basis for this validity evaluation may be whether the process in question is allowed to access the requested resource, possibly on the grounds of technical compatibility or the level of priority of the requesting process. Another basis for the validity evaluation might involve consideration, where the request specifies an expected access time, of whether the access time is possible. For example, the requested access time may lie in the past, excessively far in the future, or too close the present time for implementation of the steps of the invention. A still further basis for this validity evaluation may lie in the determination of whether the requesting process 310 is in fact entitled to make reservations in accordance with the present invention. If it is determined at step 635 that the reservation request is acceptable, the method proceeds to step 640, at which the reservation request is passed to the Reservation Coordinator 352, which updates the table 354 as described hereinafter. If it is determined at step 635 that the request is not acceptable, the request is simply disregarded and the method reverts to step 605.

Figure 7:
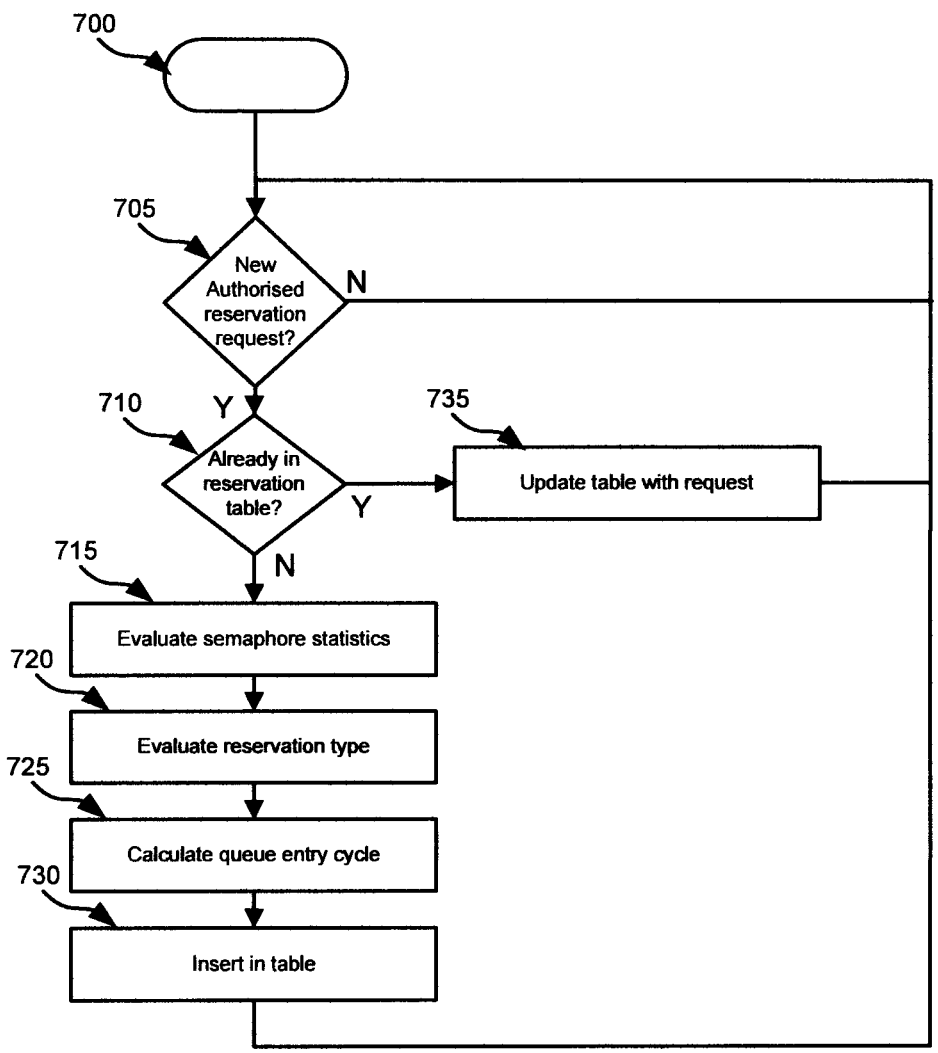
FIG. 7 shows steps implemented in the Reservation Coordinator of the reservation management unit according to certain embodiments.

FIG. 7 shows steps implemented in the Reservation Coordinator of the reservation management unit 350 according to certain embodiments. As shown in FIG. 7, the operation of the Reservation Coordinator starts at step 700, before proceeding to step 705, at which it is determined whether a new reservation request has been passed on from the Request Handler 351. If no such request has been received, the method reverts to step 705. Otherwise, the method proceeds to step 710, at which it is determined whether the request relates to an entry which is already present in the reservation table 354. If the request is determined to relate to an entry which is already present in the reservation table 354, the method proceeds to step 735, at which the relevant entry in the reservation table 354 is updated with any new information before reverting to step 705. If the reservation request is not found in the reservation table 354 at step 710, the method proceeds to step 715, at which the semaphore statistics in the semaphore statistics table 355 are evaluated insofar as they are relevant to requests for access to the shared resource 320, with a view to determining an optimal queue entry cycle—or in other words, the point at which the request should ideally be added to the queue in order for the resource to be available to the requesting process 310 when the requesting process actually issues its access request. Where the queue functions in a FIFO fashion, the queue entry cycle may be calculated simply as a function of a time specified by the requesting process (or a predetermined value), a queue length, and an average request processing time.

The method then proceeds to step 720, at which the reservation type is evaluated. Reservations may be prioritized, and the types of reservations can help to arrange the queue in an order different from FIFO. When a new reservation is issued and queued, if it is from a high priority application such as a system application, it might have a type="system" and if another arrives from a low priority application such as a user application, it will have a type="user" and its reservation will be moved after the type=system reservation. This approach may be usefully integrated into an urgency-based reprioritisation scheme. A particular process may have a reservation and be the earliest arrival, but if a reservation from a more urgent process is received, the earlier reservation will be moved back regardless. This classification of the reservations might help to prevent a situation in which low priority processes might go ahead of high priority processes, and also to define categories of processes among the ones that can use the reservation system. Additional criteria can be used. For example, a criterion might be that after a certain number of "re-prioritizations", a reservation—even if it is of low priority—cannot be moved back in the queue.

Thus, a first distinction is among the processes that can or cannot use the reservation system. A second distinction is among the processes which can use the reservation system and can be used to create different levels of urgency.

Incidentally, this type information may also be used in a case where a plurality of reservation requests are received, and in which each request is associated with a request priority, wherein at the step of adding the reservation to the queue, in a case where the same cycle is determined for a plurality of reservation requests, respective reservations are added to the queue such that those requests having the highest priority are added to the queue in cycles closest to the calculated entry cycle for that request.

The method then proceeds to step 725, whereupon on the basis of the determinations made at steps 715 and 720, the optimal queue entry cycle can be determined. The method then proceeds to step 730, where the reservation table 354 is updated to incorporate the details of the newly-determined reservation, for adding to the semaphore queue 341 at the appropriate time.

Figure 8:
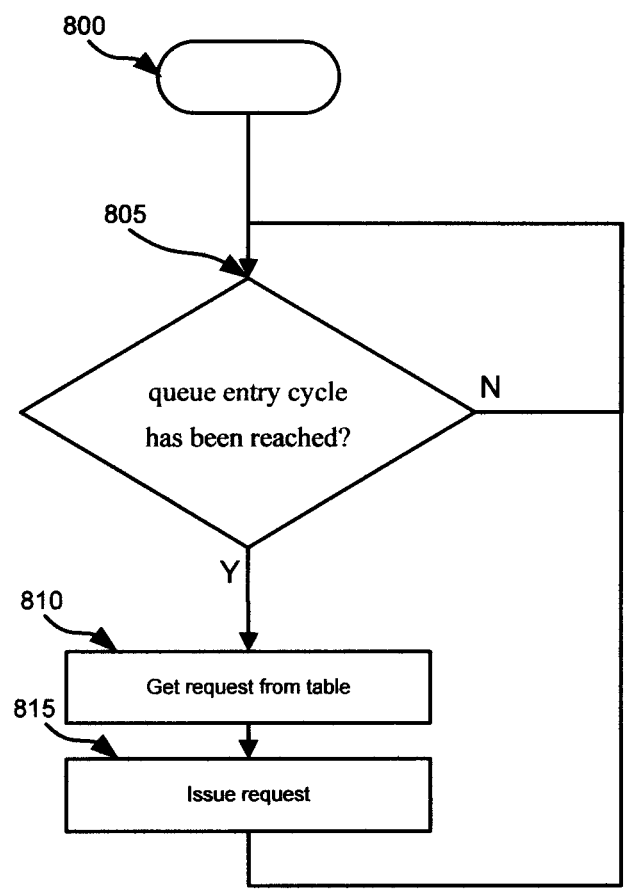
FIG. 8 shows steps implemented in the Reservation Scheduler of the reservation management unit according to certain embodiments.

FIG. 8 shows steps implemented in the Reservation Scheduler 353 of the reservation management unit 350 according to certain embodiments. It has been described with respect to FIGS. 6 and 7 how requests from a process 310 are received and converted into entries in the reservation table 354. The function of the Reservation Scheduler 353 is to monitor the reservation table 354, and when the queue entry cycle determined by the Reservation Coordinator 352 is reached, to issue a request on behalf of the process 310. More particularly, as shown in FIG. 8, the method starts at step 800, before proceeding to step 805, at which for a given entry in the reservation table 354, it is determined whether the calculated queue entry cycle has been reached. If it is determined that the calculated queue entry cycle has been reached, the method proceeds to step 810, or otherwise loops back to step 805. In a case where the reservation table 354 contains more than one entry, this process may be repeated for each entry. At step 810, the method retrieves the other details from the reservation table 354, in particular the identity of the requesting process 310 and the requested shared resource 320, before proceeding to step 815, at which a request is issued on behalf of the requesting process 310 to the queue corresponding to the requested shared resource 320.

According to the preceding embodiment, the Reservation Management unit 350 gathers and retrieves historical info about the specific semaphore queue amount and average wait times. Based on this information, it can decide the proper time to queue a request. According to alternative embodiments, the Reservation Management unit 350 may simply receive the reservation request and forward it to the semaphore, for example at a time specified by the requesting process itself, or at a time that is simply a fixed amount ahead of the expected access request.

At least in the case of a FIFO queue, the queue entry cycle will be calculated at least partially on the basis of the queue length. The value for the queue length used in this calculation may be the actual length of the queue at the time the reservation request is received, or when the calculation is made, or at some other convenient instant. Alternatively, the queue length may be an average queue length determined across a predetermined number of preceding cycles.

According to certain embodiments, the Reservation Management unit 350 not only issues the access request, but also receives the response from the semaphore module 330, such that the Reservation Management unit 350 handles all communications between the process 310 and the shared resource 320.

As described above, the Reservation Management unit 350 may handle requests from a plurality of processes for a plurality of shared resources. Alternatively, there may be several instances of the Reservation Management unit 350, one for each process, or one for each shared resource, or indeed one per pending request.

The term "queue entry cycle" may refer to a particular time, with reference to a standard or system clock. Alternatively, the term "queue entry cycle" may refer to a number of queue positions, instruction cycles, process code lines or instructions, or indeed any other manner in which a particular moment may be specified. As described above, the queue entry cycle is preferably determined with reference to statistics gathered reflecting the past behavior of the queue 341, with a view to estimating as accurately as possible the time the access request can be expected to proceed through the queue, from which it may be determined when the access request should be added to the queue so as to arrive at the head of the queue at the time required by the process.

More particularly, the query for the reservation to understand how much before it has to be issued can be based on real time data (e.g., what is the status now) and/or on historical data.

At least in the case of a FIFO queue, the average request processing time may be used in calculating the queue entry cycle. The average request processing time may be a predetermined value for the time at which the access request is expected, or may otherwise be determined on a statistical basis, for example on the basis of an average request processing time determined across a predetermined number of preceding cycles as recorded in the semaphore statistics table 355.

Using real time data, the status is known when the query is run, but not how it may develop in the future, although the measurement may be periodically updated.

Using average historical data, a status can be determined independently from when a new query is run.

During the semaphore activity, some statistics can be gathered, such as:
a) related to the wait queue length (e.g., average, low, and high watermark values), meaning how many requests were queued in wait when a new one is queued; and/or
b) related to the wait queue time (e.g., average, longest, and shortest), meaning how much time a queued request has to wait before being "served".

These statistics can be continuously refreshed, and might also be categorized and related to date (e.g., week day, week in month) and to time (e.g., morning, afternoon, night) and system.

All of this information can be used to better forecast the semaphore status at the time it will be needed to be used by the process. For example, knowing in advance that the average wait time is x seconds per request and that there are, on average, y requests waiting in queue, the application knows that it has to issue its reservation at least x times y seconds in advance to be sure on average to be served when needed. The more accurate the statistics (or the real time query), the more accurate the advantage that can be obtained.

The new point when the reservation access request is issued might vary based on a "feedback loop" from the reservation system. For example, the process can have several reservation issuance points, and one or the other can be enabled to issue the reservation, based on the results of previous attempts or on a value received from the reservation system.

Similarly, there may be provided a step of monitoring the length of the queue and the average request processing time, and reporting these to the process, such that the process may issue the request at a time as close as possible to the calculated queue entry cycle.

In some embodiments, the reservation management unit may determine that the reservation received from the current issuance point is too early—that is, that the time by which the reservation request anticipates the foreshadowed access request substantially exceeds the expected time for the reservation request to pass through to the head of the queue. In this case, the reservation management unit may suggest that the process use one of the later request issuance points, if available, for the present request, or for future requests. By the same token, where earlier issuance points are available and the reservation from point is too late—that is, if the time by which the reservation request anticipates the foreshadowed access request is less than the expected time for the reservation request to pass through to the head of the queue—then the reservation management unit may suggest that the process use one of the earlier request issuance points, if available, for future requests.

In view of the foregoing, one may consider embodiments in which the reservation request issued by the process would contain the identity of the requesting process, the identity of the requested resource, and optionally specify the anticipated request time and the request type. The anticipated request time may contain information indicating the time at which the access request is to be expected, or indicating a period by which the arrival of the access request is expected to be separated from the arrival of the reservation request. Where the anticipated request time is not specified, all reservation requests may be assumed to be issued a predetermined period before the access request.

Similarly, the access request issued by the process would contain the identity of the requesting process, the identity of the requested resource, and optionally details of alternative issuance points.

Alternatively, details of alternative issuance points might be incorporated in the reservation request.

Figure 9:
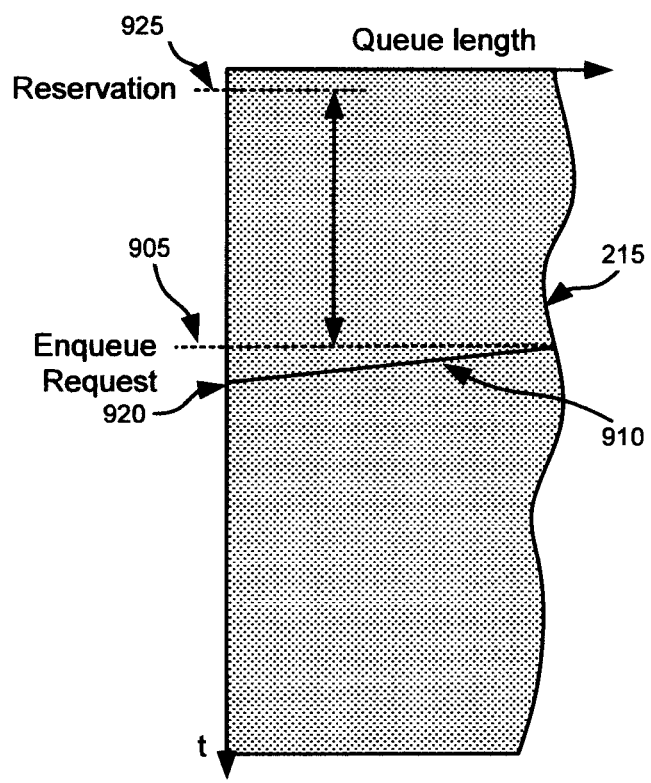
FIG. 9 shows the possible progress of a request through the queue in the system of FIG. 3 with an optimally calculated queue entry cycle.

FIG. 9 shows the possible progress of a request through the queue in the system of FIG. 3 with an optimally calculated queue entry cycle. FIG. 9 plots queue position on a horizontal axis, and time on a vertical axis. The total length of the queue at any given time is represented by the shaded area between the axes and the line 215. As shown, the process issues a reservation request at a time indicated by the line 925. A queue entry cycle represented by the line 905 is calculated, until which time the reservation request is retained in the request table 354. The reservation access request is enqueued at the entry cycle represented by the line 905, and the request proceeds along the queue in the manner represented by the line 910, and eventually arrives at the head of the queue at the point 920, whereupon the resource 320 becomes available to the process 310, coinciding exactly with the moment at which the process issues its access request. The line 910 is shown as a straight line, implying the use of an average queue processing rate. Naturally, however, the real progress of the reservation access request through the queue will not generally be so linear, since different processes will often require the resource for different periods, and as discussed above according to certain embodiments, the queue is not necessarily FIFO, so that the reservation access request may even temporarily lose ground.

Notwithstanding the foregoing, there will generally be an error between the time at which the reservation access request reaches the head of the queue and the time at which the process 310 issues its access request.

Here there are two possible special case situations. Firstly, the semaphore may provide the signal for processing before the process is ready, as will now be discussed with reference to FIG. 10.

Figure 10:
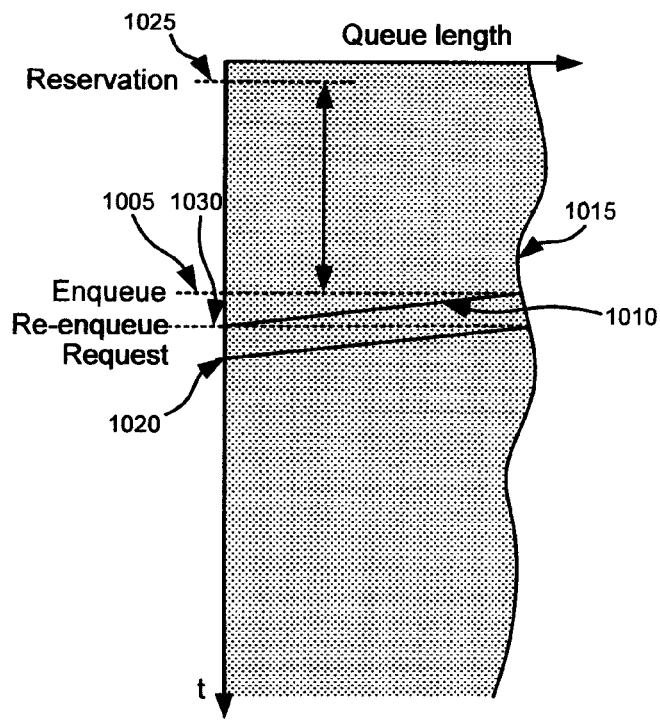
FIG. 10 shows the possible progress of a request through the queue in the system of FIG. 3 with a premature queue entry cycle.

FIG. 10 shows the possible progress of a request through the queue in the system of FIG. 3 with a premature queue entry cycle. FIG. 10 plots queue position on a horizontal axis, and time on a vertical axis. The total length of the queue at any given time is represented by the shaded area between the axes and the line 215. As shown, the process issues a reservation request at a time indicated by the line 1025. A queue entry cycle represented by the line 1005 is calculated, until which time the reservation request is retained in the request table 354. The reservation access request is enqueued at the entry cycle represented by the line 1005, and the request proceeds along the queue in the manner represented by the line 1010, and eventually arrives at the head of the queue at the point 1020, whereupon the resource 320 becomes available to the process 310. In this example however, the process 310 has not yet reached the point of issuing its access request—in other words, the reservation access request was enqueued too soon. Where this occurs, the Reservation Management Unit can simply issue a dummy operation and automatically enqueue a new request, as indicated by the line 1030. The request once again proceeds along the queue in the manner represented by the line 1010, and eventually arrives at the head of the queue at the point 1020, whereupon the resource 320 becomes available to the process 310, coinciding exactly with the moment at which the process issues its access request. Thus, if the reservation reaches the head of the queue before the access request is received, the reservation may be cancelled and a new reservation created at the end of the queue, or alternatively, the new reservation may be created at a position in the queue calculated as a function of a time specified in the reservation access request and an average request processing time.

Where this occurs, the reservation management unit can evaluate the time interval between two consecutive dummy enqueues to evaluate a better time frame for a following automatic request, avoiding flooding the semaphore queue uselessly.

Secondly, the semaphore may provide the signal for processing after the truly optimal moment, as will now be discussed with reference to FIG. 11.

Figure 11:
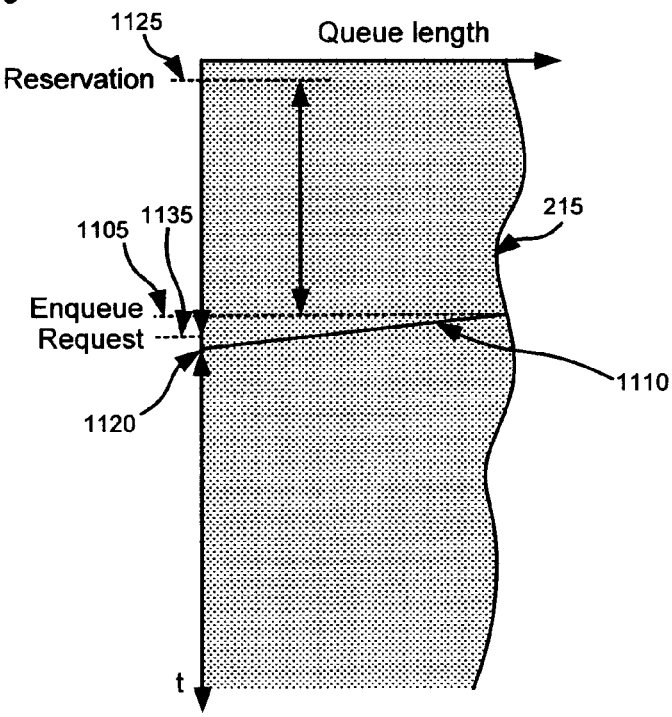
FIG. 11 shows the possible progress of a request through the queue in the system of FIG. 3 with a tardy queue entry cycle.

FIG. 11 shows the possible progress of a request through the queue in the system of FIG. 3 with a tardy queue entry cycle. FIG. 11 plots queue position on a horizontal axis, and time on a vertical axis. The total length of the queue at any given time is represented by the shaded area between the axes and the line 215. As shown, the process issues a reservation request at a time indicated by the line 1125. A queue entry cycle represented by the line 1105 is calculated, until which time the reservation request is retained in the request table 354. The reservation access request is enqueued at the entry cycle represented by the line 1105, and the request proceeds along the queue in the manner represented by the line 1110. In this example, the process 310 issues its access request as indicated by the line 1135 before the reservation access request arrives at the head of the queue at the point 1120, such that the process 310 is obliged to wait until the reservation access request arrives at the head of the queue whereupon the resource 320 becomes available. This scenario is still preferable over the prior art situation, since the process will never have to wait for longer than it takes for the reservation access request to traverse the whole queue, and on average, even assuming minimal accuracy in the entry cycle calculation, the wait will be halved.

In some cases, the arrival of the access request before the availability of the resource may prompt the generation of a further enqueued request, in which case the new request is matched against the one issued in advance and the reservation management unit "links" the actual request with the queue request issued in advance. When in time the new request is processed, it has already acquired in advance a good position inside the queue.

Generally, only software incorporating reservation request instructions can benefit from the preceding embodiments. In some cases, for example where a process emits access requests at regular intervals or exhibits some other pattern which makes it possible to externally predict the arrival of an access request, is may be possible to generate reservation requests without modifying the process software.

The advantages can also be restricted to high priority tasks or to specific circumstances where it is requested to speed up performance.

According to certain embodiments, processes requiring access to shared resources are adapted to issue a reservation request, such that a place in a resource access queue, such as one administered by means of a semaphore system, can be reserved for the process. The reservation is issued by a Reservation Management module at a time calculated to ensure that the reservation reaches the head of the queue as closely as possible to the moment at which the process actually needs access to the resource. The calculation may be made on the basis of priority information concerning the process itself, and statistical information gathered concerning historical performance of the queue.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by, or in connection with, a computer or any instruction execution system. For the purposes of this description, a computer-usable or computer-readable medium can be any apparatus that can contain or store the program for use by, or in connection with, the instruction execution system, apparatus, or device.

The medium can be an electronic, magnetic, optical, electromagnetic, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Figure 12:
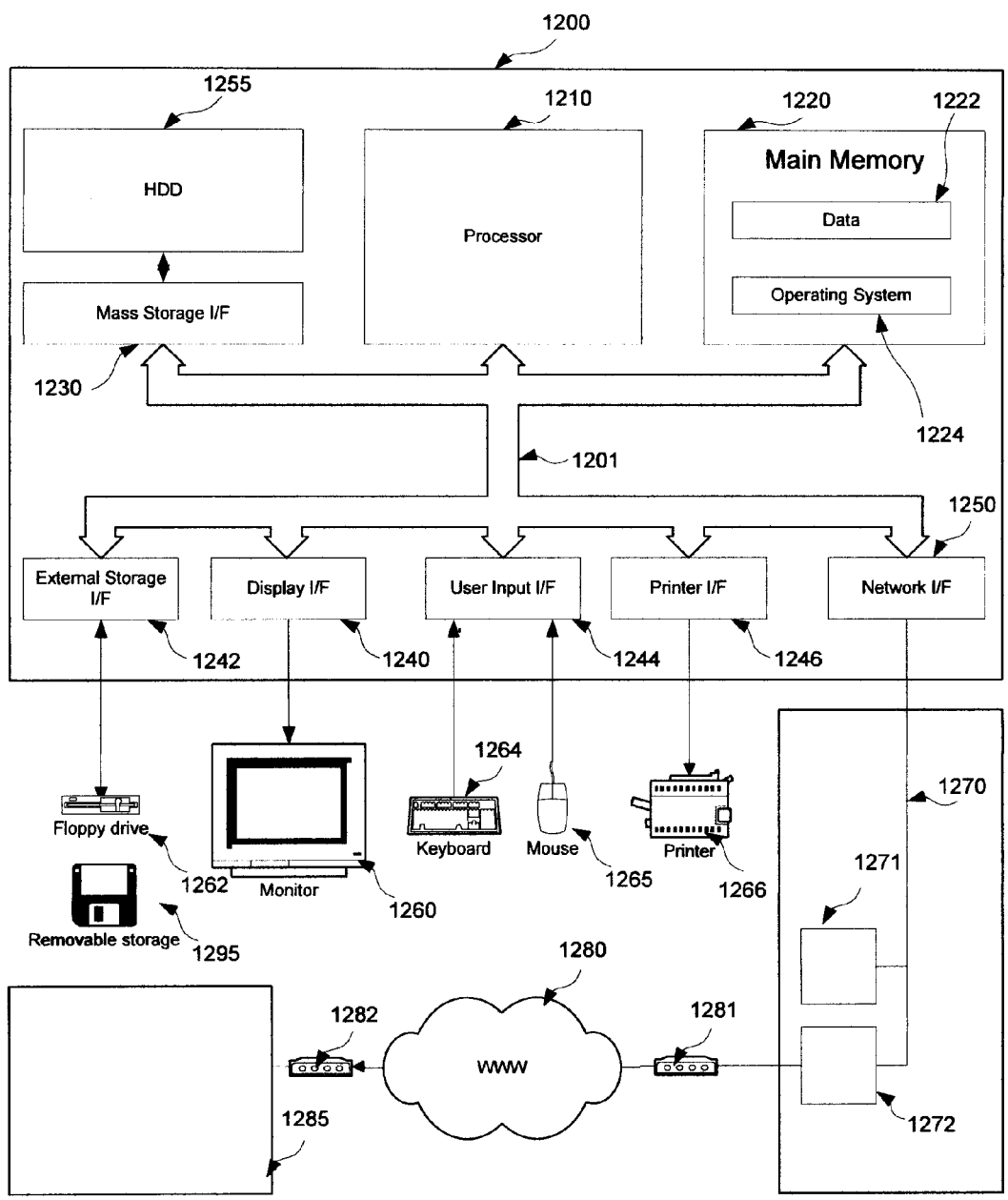
FIG. 12 shows a data processing system suitable for implementing certain embodiments.

FIG. 12 shows a data processing system suitable for implementing certain embodiments.

Computer system 1200 comprises a processor 1210, a main memory 1220, a mass storage interface 1230, a display interface 1240, and a network interface 1250. These system components are interconnected through the use of a system bus 1201. Mass storage interface 1230 is used to connect mass storage devices (e.g., hard disk drive 1255) to computer system 1200. One specific type of removable storage interface drive 1262 is a floppy disk drive which may store data to and read data from a floppy disk 1295, but many other types of computer-readable storage medium may be envisaged, such as readable and optionally writable CD ROM drives. There is similarly provided a user input interface 1244 which receives user interactions from interface devices such as a mouse 1265 and a keyboard 1264. There is still further provided a printer interface 1246 which may send and optionally receive signals to and from a printer 1266.

Main memory 1220 in accordance with the preferred embodiments contains data 1222 and an operating system 1224.

Computer system 1200 utilizes well-known virtual addressing mechanisms that allow the programs of computer system 1200 to behave as if they only have access to a large, single storage entity instead of access to multiple, smaller storage entities such as main memory 1220 and hard disk drive 1255. Therefore, while data 1222 and operating system 1224 are shown to reside in main memory 1220, those skilled in the art will recognize that these items are not necessarily all completely contained in main memory 1220 at the same time. It should also be noted that the term "memory" is used herein to generically refer to the entire virtual memory of computer system 1200.

Data 1222 represents any data that serves as input to, or output from, any program in computer system 1200. Operating system 1224 is a multitasking operating system known in the industry as OS/400®; however, those skilled in the art will appreciate that the spirit and scope of the present invention is not limited to any one operating system. ("OS/400" is a registered trademark of International Business Machines Corporation in the United States, other countries, or both.)

Processor 1210 may be constructed from one or more microprocessors and/or integrated circuits. Processor 1210 executes program instructions stored in main memory 1220. Main memory 1220 stores programs and data that processor 1210 may access. When computer system 1200 starts up, processor 1210 initially executes the program instructions that make up operating system 1224. Operating system 1224 is a sophisticated program that manages the resources of computer system 1200. Some of these resources are processor 1210, main memory 1220, mass storage interface 1230, display interface 1240, external storage interface 1242, network interface 1250, and system bus 1201.

Although computer system 1200 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully-programmed microprocessors that are used to off-load compute-intensive processing from processor 1210. However, those skilled in the art will appreciate that the present invention applies equally to computer systems that simply use I/O adapters to perform similar functions.

Display interface 1240 is used to directly connect one or more displays 1260 to computer system 1200. These displays 1260, which may be non-intelligent (i.e., dumb) terminals or fully programmable workstations, are used to allow system administrators and users to communicate with computer system 1200. Note, however, that while display interface 1240 is provided to support communication with one or more displays 1260, computer system 1200 does not necessarily require a display 1265, because all needed interaction with users and other processes may occur via network interface 1250.

Network interface 1250 is used to connect other computer systems and/or workstations (e.g., 1272 in FIG. 12) to computer system 1200 across a network 1270. The present invention applies equally no matter how computer system 1200 may be connected to other computer systems and/or workstations, regardless of whether the network connection 1270 is made using present-day analog and/or digital techniques or via some networking mechanism of the future. In addition, many different network protocols can be used to implement a network. These protocols are specialized computer programs that allow computers to communicate across network 1270. TCP/IP (Transmission Control Protocol/Internet Protocol) is an example of a suitable network protocol, for example over an Ethernet network. As shown, the network 1270 connects the system 1200 to two further devices 1271 and 1272, which may be other computer systems similar to that described above, or other network-capable devices such as printers, routers, etc. In the present example, network device 1272 is a local server, which is connected via a modem 1281 to a public network 1280 such as the world wide web. By means of this public network 1280, a connection to a remote device or system 1285 via a modem 1282 may be established.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of media used. Examples of suitable media were discussed above.

The invention claimed is:

1. A system for obtaining access to a shared resource in a data processing system, the system comprising:
    a computer comprising a processor; and
    instructions which are executable, using the processor of the computer, to perform:
        sending a reservation request from a process to an access queue manager that manages a queue of access requests for the shared resource, wherein:
            the reservation request is adapted to notify the access queue manager as a foreshadowing of a forthcoming access request from the process that will request access to the shared resource; and
            the reservation request is adapted to cause the access queue manager to calculate a queue entry cycle, the calculated queue entry cycle indicating when the access queue manager will subsequently queue the reservation request, on behalf of the process, in the queue of access requests;
        sending the foreshadowed access request from the process to the access queue manager a predetermined time after sending the reservation request; and
        accessing the shared resource by the process at a time of sending the foreshadowed access request, the reservation request having established an advance reservation in the queue that enables the process to obtain, at the predetermined time, a semaphore that allows the accessing.

2. The system of claim 1, wherein the reservation request further comprises:
    a time calculated by the process for queuing the reservation request onto the queue, wherein the queue controls access to the semaphore and the time comprises an interval that corresponds to the predetermined time.

3. A non-transitory computer readable medium having encoded thereon a computer program for obtaining access to a shared resource in a data processing system, the computer program comprising instructions which, when executed by a computer, cause the computer to perform:
    receiving a reservation request from a process at an access queue manager that manages a queue of access requests for the shared resource, the reservation request foreshadowing a forthcoming access request from the process for accessing the shared resource;
    responsive to receiving the reservation request, calculating a queue entry cycle indicating when to subsequently queue the reservation request, on behalf of the process, in the queue of access requests;
    responsive to reaching the calculated queue entry cycle, queuing the reservation request, on behalf of the process, in the queue of access requests;
    receiving the foreshadowed access request at the access queue manager from the process a predetermined time after receiving the reservation request; and
    accessing the shared resource by the process at a time of sending receiving the foreshadowed access request from the process, the reservation request having established an advance reservation in the queue that enables the process to obtain, at the predetermined time, a semaphore that allows the accessing.

* * * * *